(12) United States Patent
Kanada

(10) Patent No.: US 8,014,779 B2
(45) Date of Patent: Sep. 6, 2011

(54) WIRELESS NETWORK CONNECTION SWITCHING MANAGEMENT SYSTEM AND METHOD

(75) Inventor: Yoshihisa Kanada, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1175 days.

(21) Appl. No.: 10/461,087

(22) Filed: Jun. 13, 2003

(65) Prior Publication Data
US 2004/0014474 A1   Jan. 22, 2004

(30) Foreign Application Priority Data
Jun. 20, 2002 (JP) ................................. 2002-180464

(51) Int. Cl.
*H04W 36/00* (2009.01)
(52) U.S. Cl. ................... 455/439; 455/444; 455/456.1; 455/456.2
(58) Field of Classification Search .................. 455/444, 455/456.1–456.5, 222.1, 439, 426.1, 440, 455/448, 488, 436, 438, 432.1, 443
See application file for complete search history.

(56) References Cited

U.S. PATENT DOCUMENTS

| | | | | |
|---|---|---|---|---|
| 5,822,697 A | * | 10/1998 | Matsuzawa | 455/443 |
| 6,038,449 A | * | 3/2000 | Corriveau et al. | 455/439 |
| 6,175,735 B1 | * | 1/2001 | Meyer | 455/440 |
| 6,985,931 B2 | * | 1/2006 | Dowling | 709/217 |
| 7,010,300 B1 | * | 3/2006 | Jones et al. | 455/439 |
| 2002/0085516 A1 | * | 7/2002 | Bridgelall | 370/329 |
| 2002/0147008 A1 | * | 10/2002 | Kallio | 455/426 |
| 2004/0038647 A1 | * | 2/2004 | Mahany | 455/73 |
| 2004/0203788 A1 | * | 10/2004 | Fors et al. | 455/439 |
| 2006/0291455 A1 | * | 12/2006 | Katz et al. | 370/355 |

* cited by examiner

*Primary Examiner* — Charles Appiah
*Assistant Examiner* — Jaime Holliday
(74) *Attorney, Agent, or Firm* — Lieberman & Brandsdorfer, LLC

(57) ABSTRACT

A system and method for wireless network connection switching management is shown. The system notifies a mobile user that his portable terminal is within an area where it can be provided with local fast wireless communication service such as a hot-spot service versus using a low speed, but wide coverage wireless access network. Radio waves for communication transmitted by a mobile wireless terminal are received at a WWAN receiving system provided in a WLAN system. The radio waves are capable of communicating with a WWAN (Wireless Wide Area Network) system utilizing a third generation mobile phone network and a WLAN (Wireless Local Area Network) system providing a hot-spot service. Instructions are output to the terminal via the Internet and a base station of the WWAN system that the mobile terminal is within an AP service area of an access point of the WLAN system. The user may choose to switch wireless network access networks in order to achieve faster access to the Internet. Additionally, the method incorporates mechanisms to achieve reduced power consumption by the mobile terminal.

16 Claims, 13 Drawing Sheets

WIRELESS NETWORK CONNECTION SWITCHING MANAGEMENT SYSTEM AND METHOD

BACKGROUND OF THE INVENTION

The present invention relates to a wireless communication system for mobile communication, and more particularly to a wireless communication system capable of selecting an optimal wireless communication service among multiple different wireless communication services.

One of the known methods of connecting to the Internet using a mobile terminal such as a notebook computer and a PDA from outside the office or home is to utilize a mobile phone service. While the method is advantageous in that the service area is large, it has a problem that the communication speed is relatively slow.

As a new method of connecting to the Internet with a mobile terminal, a so-called hot-spot service has now been provided, which can be available by installing an access point for a wireless LAN in a people-gathering public space such as a department store or a coffee shop. While this method is advantageous in that the communication speed is relatively high in comparison with that of a mobile phone service, it has a problem that the service area is relatively small in comparison with that of a mobile phone service.

Thus, the present situation is that several hot-spot service areas providing high-speed communication service are scattered within a mobile phone service area providing low-speed communication service. In order to take advantage of the merits of both, it is conceivable to mount a radio transceiver for mobile phone services and a radio transceiver for hot-spot services onto a mobile terminal to enable the mobile terminal to usually connect to the Internet via a mobile phone service and switch from Internet connection via the mobile phone service to Internet connection via a hot-spot service when it is within the service area of the hot-spot service.

As a prerequisite for switching from Internet connection utilizing a mobile phone service to that utilizing a hot-spot service, it is necessary to check if the mobile terminal is within the service area of the hot-spot service. One method of this is to check if the mobile terminal is within a hot-spot service area using its radio transceiver for a hot-spot service while using its radio transceiver for a mobile phone service to connect to the Internet.

By using the radio transceiver for a mobile phone service and the radio transceiver for hot-spot service at the same time, however, power consumption of the mobile terminal is considerably increased. Especially, mobile terminals are often battery-operated, and therefore increase in power consumption immediately brings about reduction in battery life, or reduction in available time of the mobile terminal.

The present invention is intended to solve the technical problems mentioned above, and its purpose is to allow reduced power consumption of mobile terminals.

Another purpose is to notify the user that his mobile terminal is within an area where it can be provided with a local high-speed communication service such as a hot-spot service.

SUMMARY OF THE INVENTION

For those purposes described above, based on a fact that a low-speed wireless communication service is utilized in wide areas other than limited areas such as hot spots in which a high-speed wireless communication service is provided, the invention allows reduced power consumption of mobile terminals and selection of an optimal wireless communication service by notifying a mobile terminal via such a low-speed wireless communication service that a high-speed wireless communication service is available to it. The invention is a wireless communication system comprising a base station providing a low-speed wireless communication service for a wide area, an access point providing a high-speed wireless communication service for a limited area, and a mobile terminal capable of receiving both of the low-speed wireless communication service and the high-speed wireless communication services, wherein the wireless communication system detects the presence of the mobile terminal receiving the low-speed wireless communication service within the limited area and directs the mobile terminal to switch to the high-speed wireless communication service via the low-speed wireless communication service.

It is preferable that the access point further comprises a function of detecting the presence of the mobile terminal receiving the low-speed wireless communication service within the limited area and directing the terminal to switch to the high-speed wireless communication service via the low-speed wireless communication service so that the wireless communication system allows precise detection of mobile terminals within the limited area. It is also preferable that the access point receives low-speed wireless communication signals transmitted by the mobile terminal at the access point and detects the presence of the terminal within the limited area so that the wireless communication system allows easy detection of the mobile terminal.

From another aspect, the present invention is an access point providing a limited-area wireless communication service for a limited area, which comprises: detection means for detecting the presence of a mobile terminal within the limited area, the mobile terminal receiving a public wireless communication service from a base station of a public wireless communication system; and output means for outputting a direction for the mobile terminal to switch to the limited-area wireless communication service, to the base station based on the detection by the detection means.

The detection means may recognize the ID of the mobile terminal that is included in a public wireless communication signals transmitted by the mobile terminal, and the output means may output the switching direction associated with the ID to the base station. The output means may also output the switching direction via a network connected to the base station.

From still another aspect, the detection device of the present invention comprises: detection means for detecting the presence of a mobile terminal within a limited area where a limited-area wireless communication service is provided, the mobile terminal receiving a public wireless communication service from a base station of a public wireless communication system; and output means for outputting a direction for the mobile terminal to switch to the limited-area wireless communication service, to the base station based on the detection by the detection means. The detection means detects the presence of the mobile terminal within the limited area based on reception of public wireless communication signals transmitted by the mobile terminal.

From still another aspect, the present invention is a base station providing a wide-area wireless communication service for a wide area, comprising: reception means for receiving information about a mobile terminal from an access point providing a limited-area wireless communication service for a predetermined limited area; and sending means for sending information on connection of the limited-area wireless communication service to the mobile terminal based on the information about the mobile terminal received from the reception means. The sending means sends the information on connection of the limited-area wireless communication service by utilizing the wide-area wireless communication service.

From another aspect, the mobile terminal of the present invention comprises: the first communication means for a wide-area wireless communication; the second communication means for receiving a wireless communication service provided within a limited area; and reception means for receiving information through the first communication means via the wide-area wireless communication service, that the wireless communication service can be executed.

The first communication means and the second communication means are comprised of one communication means capable of executing wireless communication through multiple different communication methods. The mobile terminal of the present invention further comprises switching means for switching from the first communication means to the second communication means when the reception means receives the information that the wireless communication service can be executed.

The present invention can be considered as a program that causes a computer to execute: a function of detecting the presence of a mobile terminal within a limited area where a limited-area wireless communication service is provided, the mobile terminal receiving a public wireless communication service from a base station of a public wireless communication system; and a function of directing the base station to direct the mobile terminal to switch to the limited-area wireless communication service based on the detection of the presence of the mobile terminal.

The present invention can still be considered as a program that causes a computer to execute: a function of receiving information that a predetermined mobile terminal is present within a limited area where a high-speed wireless communication service is provided, the mobile terminal being provided a low-speed wireless communication service for a wide area; and a function of notifying the mobile terminal via the low-speed wireless communication service based on the received information, that the high-speed wireless communication service is available.

The present invention may be considered as a program that causes a computer to execute: a function of receiving a direction to switch to a wireless communication service within a limited area via a wide-area wireless communication service; and a function of switching from the wide-area wireless communication service to the wireless communication service in response to the switching direction.

These programs for causing a computer to execute the functions may be stored in computer readable storage media. Such storage media include, for example, CD-ROM. The programs may be read by a CD-ROM reading device in a computer, stored in various types of memory, such as a hard disk, and executed. The programs may also be provided for a notebook PC or a mobile terminal via network by a program transmission device, for example. The program transmission device is sufficient only if it is provided with a memory for storing the programs and program transmission means for providing the programs via a network.

The present invention may be considered as a method invention in which each function in the above-mentioned program invention is expressed as a step.

The above purposes are accomplished by a combination of features as defined in independent claims in the scope of claims. Also, the dependent claims define preferable examples of the invention.

BRIEF DESCRIPTION OF THE DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which the preferred embodiments of the present invention are shown, it is to be understood at the outset of the description which follows that persons of skill in the appropriate arts may modify the invention here described while still achieving the favorable results of this invention. These embodiments are not intended to limit the invention according to the Claims and all combinations of the features described in the embodiments are not necessarily fundamental for the solution of the invention.

Accordingly, the description which follows is to be understood as being a broad, teaching disclosure directed to persons of skill in the appropriate arts, and not as limiting upon the present invention.

Figure 1:
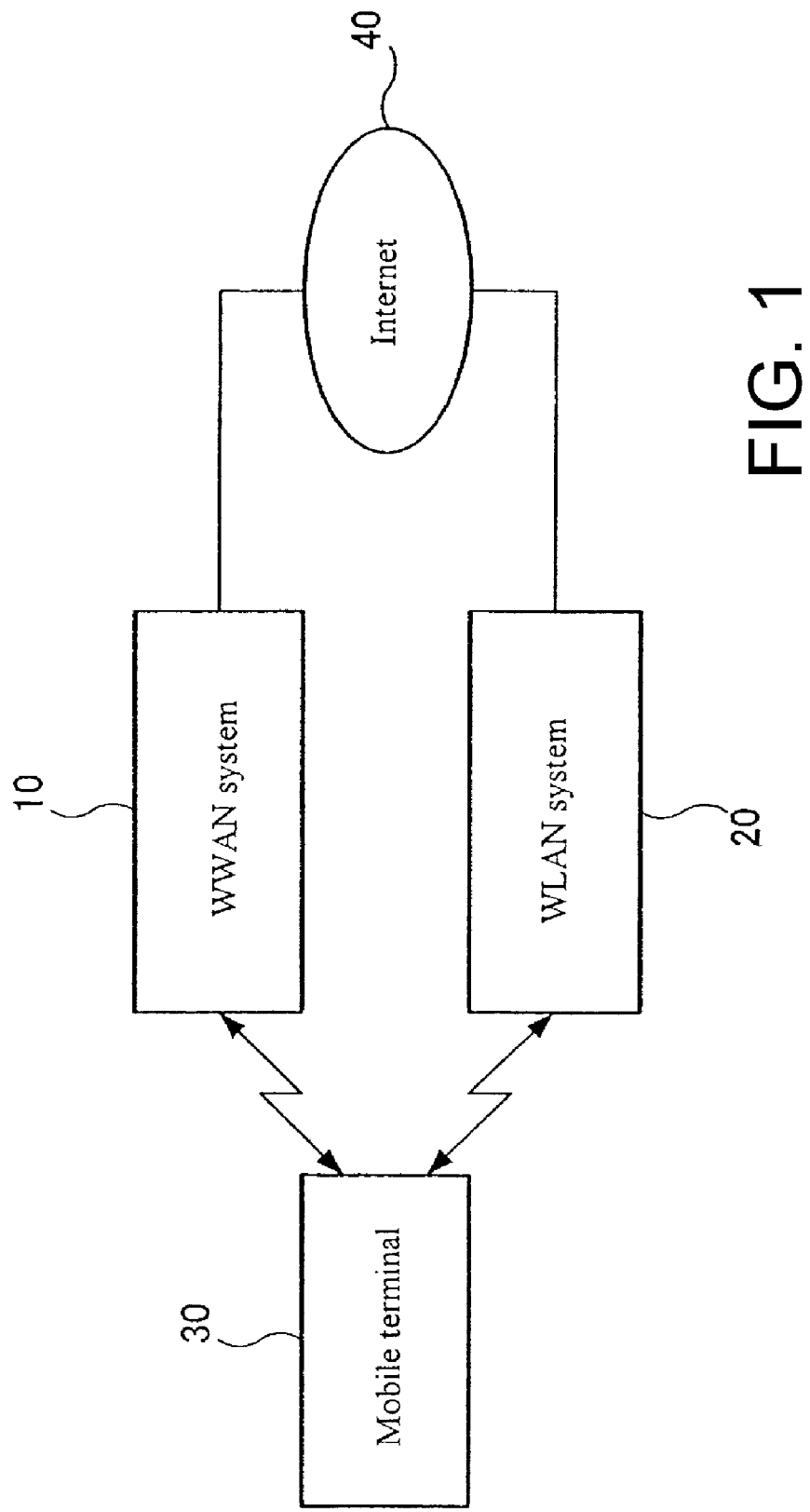
FIG. 1 is a block diagram of a wireless communication system according to the Embodiment 1.

Referring now more particularly to the accompanying drawings, FIG. 1 is a block diagram of a wireless communication system related to an Embodiment 1.

The wireless communication system comprises: a WWAN (Wireless Wide Area Network) system 10 utilizing a third generation mobile phone network; a WLAN (Wireless Local Area Network) system 20 providing a hot-spot service utilizing a wireless LAN in conformity with IEEE 802.11b; and a mobile terminal 30 (hereinafter referred to simply as the terminal 30) capable of communicating with each of the WWAN system 10 and the WLAN system 20. The WWAN system 10 and WLAN system 20 are connected to each other via the Internet 40.

Figure 2:
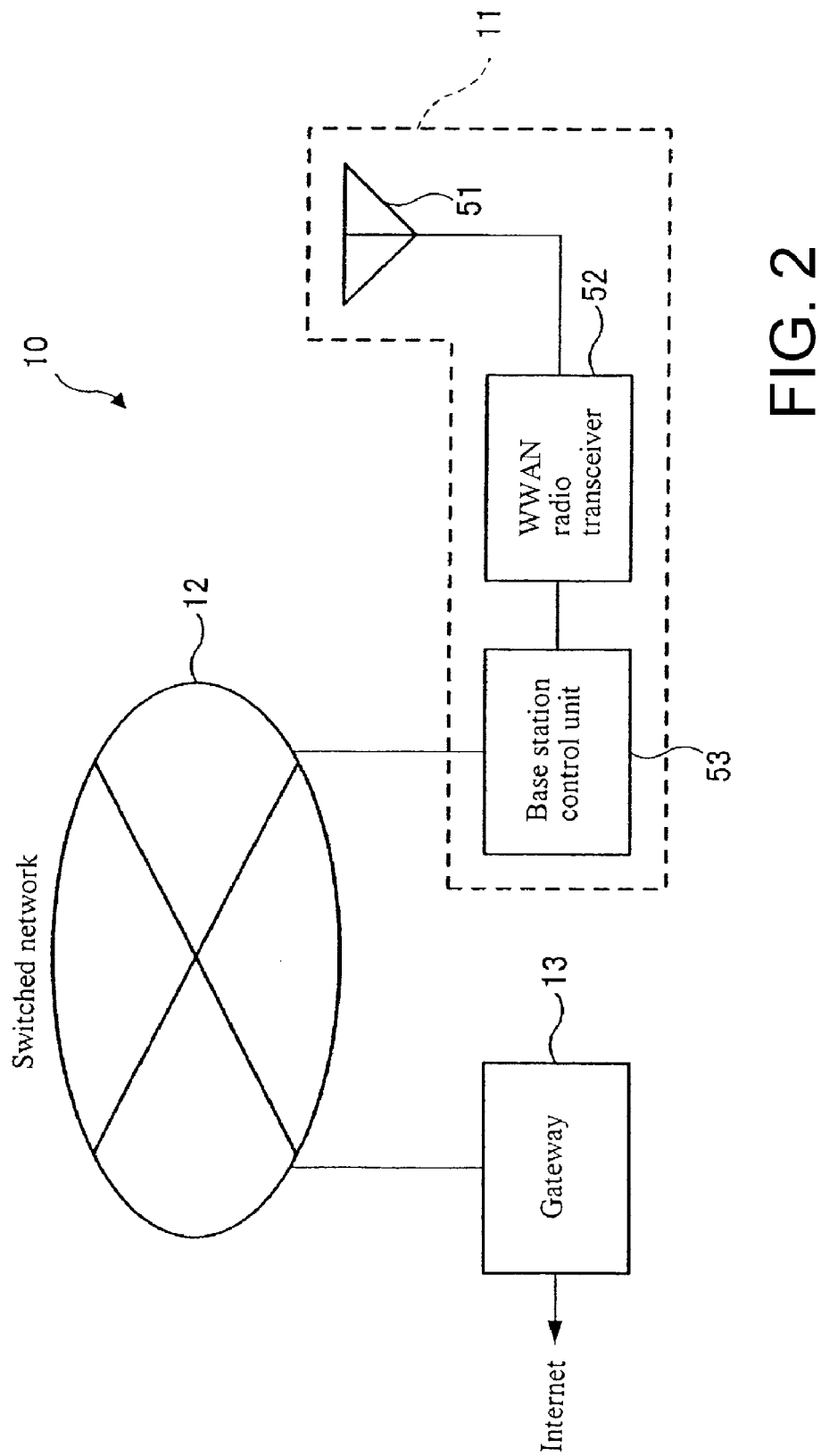
FIG. 2 illustrates a WWAN system in the Embodiment 1.

FIG. 2 shows the details of the WWAN system 10.

The WWAN system 10 comprises: a base station 11 (hereinafter referred to as the CS (Cell Station) as necessary) communicating with the terminal 30 (see FIG. 1); a switched network 12 to which the base station 11 is connected; and a gateway 13 provided between the switched network 12 and the Internet 40. Though only one base station 11 is shown in FIG. 2, multiple base stations 11 are to be connected to the switched network 12 actually. The base station 11 comprises: a WWAN antenna 51 capable of transmitting/receiving 2.0 GHz band radio waves; a WWAN radio transceiver 52 communicating with the terminal 30 using the 2.0 GHz band radio waves; and a base station control unit 53 controlling data transmission between the WWAN radio transceiver 52 and the switched network 12.

Figure 3:
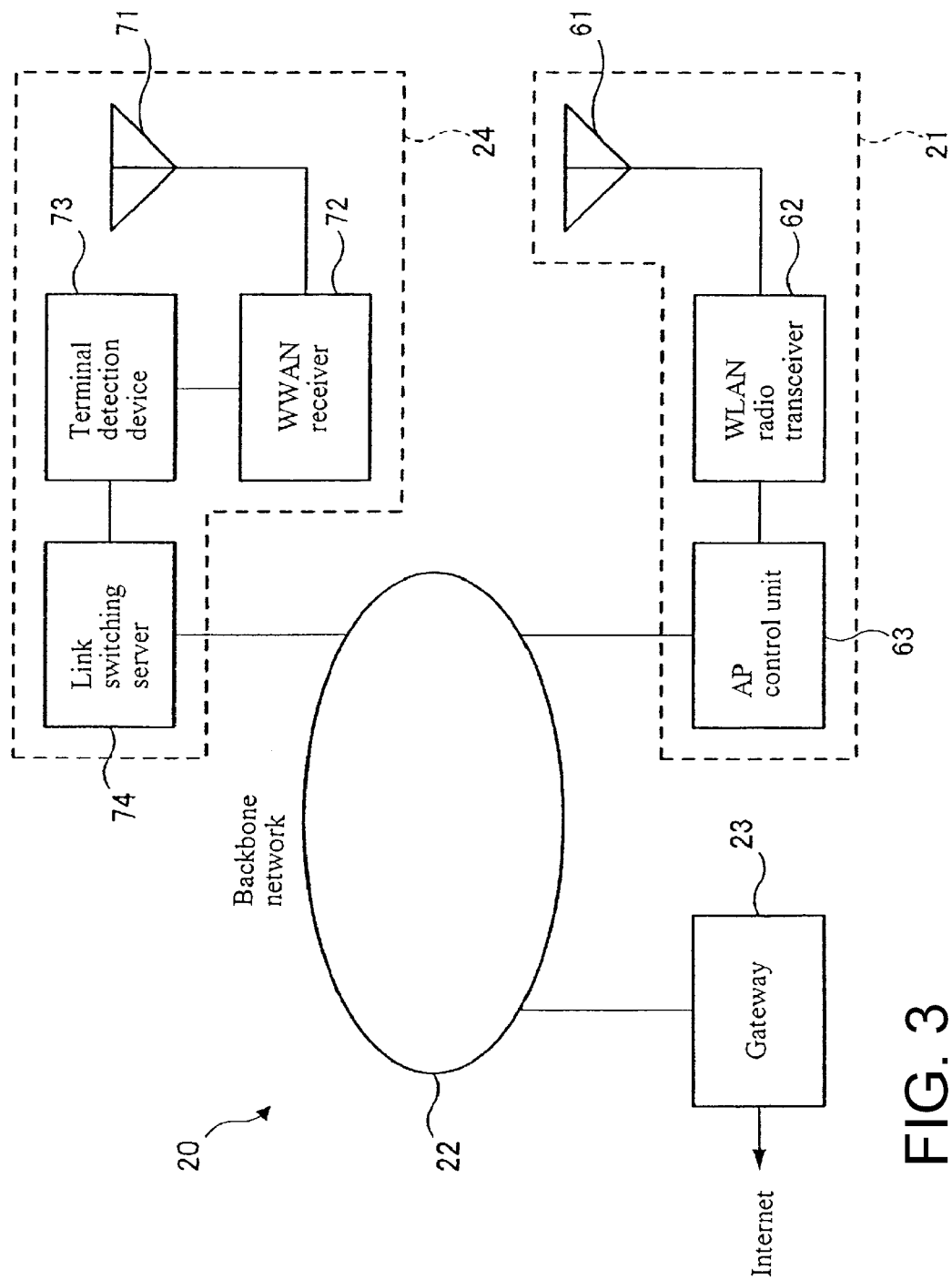
FIG. 3 illustrates a WLAN system in the Embodiment 1.

FIG. 3 shows the details of the WLAN system 20.

The WLAN system 20 comprises: an access point 21 (hereinafter referred to as the AP (Access Point) as necessary) communicating with the terminal 30 (see FIG. 1); a backbone network 22 to which the access point 21 is connected, and a gateway 23 provided between the backbone network 22 and the Internet 40. Though only one access point 21 is shown in FIG. 3, multiple access points 21 are to be connected to the backbone network 22 actually. The access point 21 comprises: a WLAN antenna 61 capable of transmitting/receiving 2.4 GHz band radio waves; a WLAN radio transceiver 62 communicating with the terminal 30 using the 2.4 GHz band radio waves; and an AP control unit 63 controlling data transmission between the WLAN radio transceiver 62 and the backbone network 22.

In the WLAN system 20, there is provided a WWAN receiving system 24 for receiving wireless communication signals from the WWAN system 10, corresponding to each access point 21. The WWAN receiving system 24 is connected to the backbone network 22 just as the access point 21. The WWAN receiving system 24 comprises: a WWAN receiving antenna 71 capable of receiving 2.0 GHz band radio waves; a WWAN receiver 72 for receiving wireless communication signals from the terminal 30; a terminal detection device 73 for detecting whether any terminal 30 communicating using 2.0 GHz band radio waves exists in the surrounding area based on the results received by the WWAN receiver 72; and a link switching server 74 for sending a signal to direct the terminal 30 to switch the link.

Figure 4:
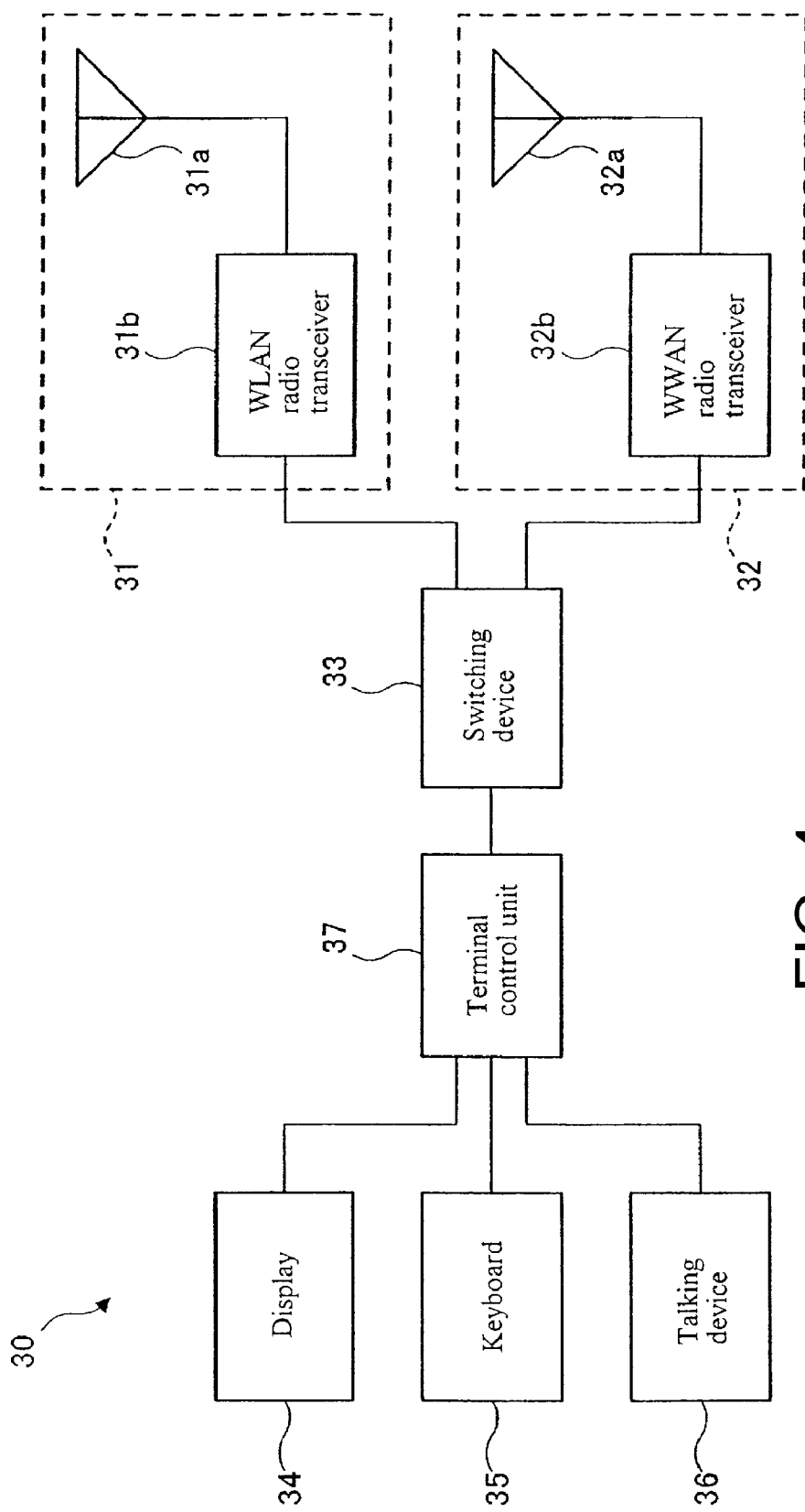
FIG. 4 illustrates a mobile terminal (terminal) in the Embodiment 1.

FIG. 4 shows the details of the terminal 30.

The terminal 30 comprises: a WLAN communication system 31 capable of communicating with the access point 21 of the WLAN system 20 (see FIG. 3); a WWAN communication system 32 capable of communicating with the base station 11 of the WWAN system 10 (see FIG. 1); and a switching device 33 for switching the communication device to be used. The WLAN communication system 31 comprises: a first antenna 31a capable of transmitting/receiving 2.4 GHz band radio waves; and a WLAN radio transceiver 31b for communicating with the access point 21 using 2.4 GHz band radio waves. On the other hand, the WWAN communication system 32 comprises: a second antenna 32a capable of transmitting/receiving 2.0 GHz band radio waves; and a WWAN radio transceiver 32b for communicating with the base station 11 using 2.0 GHz band radio waves. The terminal 30 is provided with so-called mobile phone functions, comprises a display 34 for displaying images, a keyboard 35 for input and a talking device 36, and is controlled by a terminal control unit 37 together with the switching device 33.

Figure 5:
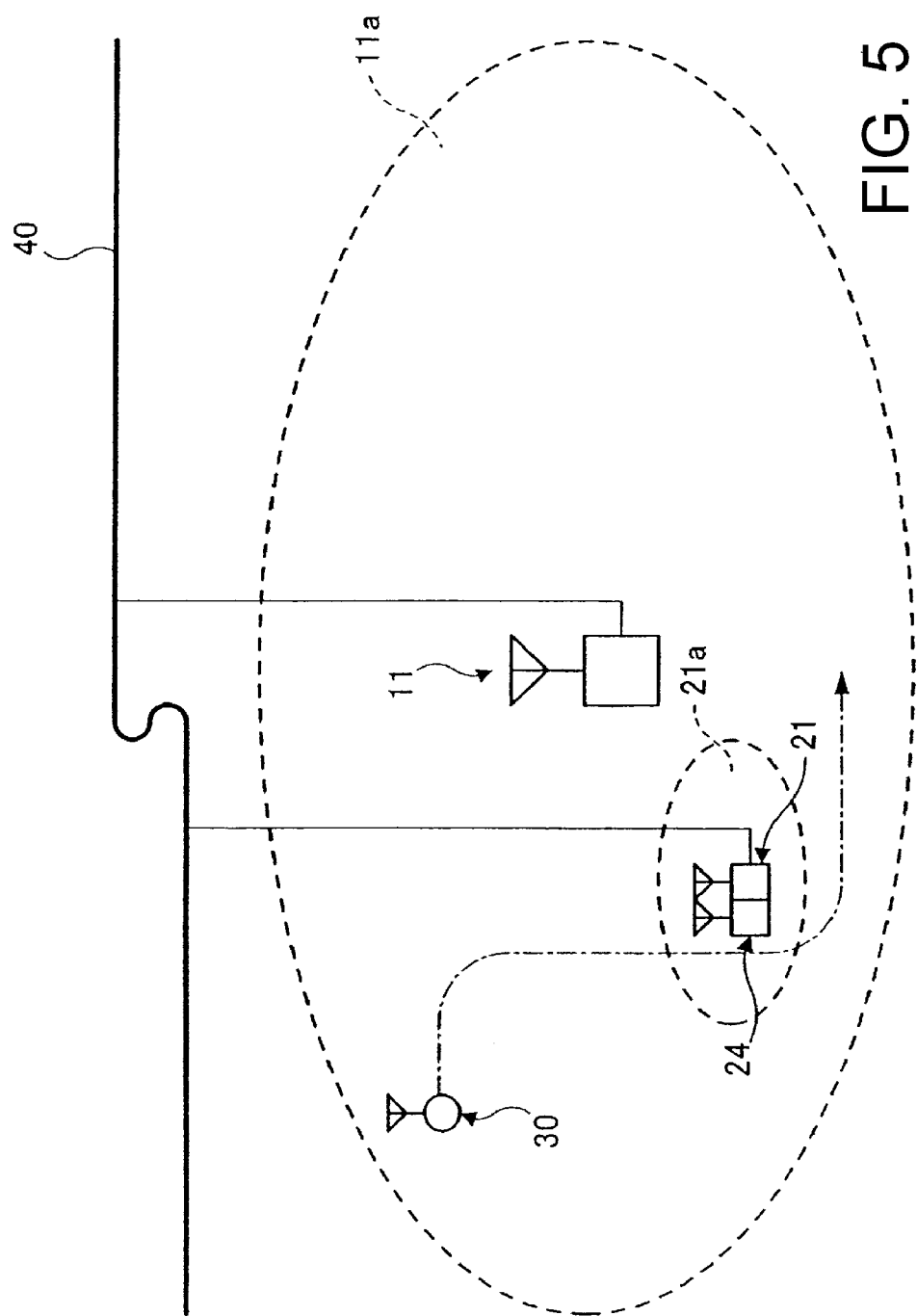
FIG. 5 illustrates correlation between a service area of a base station of a WWAN system and a service area of an access point of a WLAN system.

As shown in FIG. 5, one of the base stations 11 of the WWAN system 10 covers a wide CS service area 11a with a diameter of 3-5 km, and its maximum data communication speed is 384 kbit/sec. One of the access points 21 of the WLAN system 20 covers a narrow AP service area 21a with a diameter of 30 to 100 m, and its maximum data communication speed is 11 Mbit/sec. The AP service area 21a is within the CS service area 11a, and the WWAN receiving system 24 of the WLAN system 20 is located adjacent to its corresponding access point 21.

Figure 6:
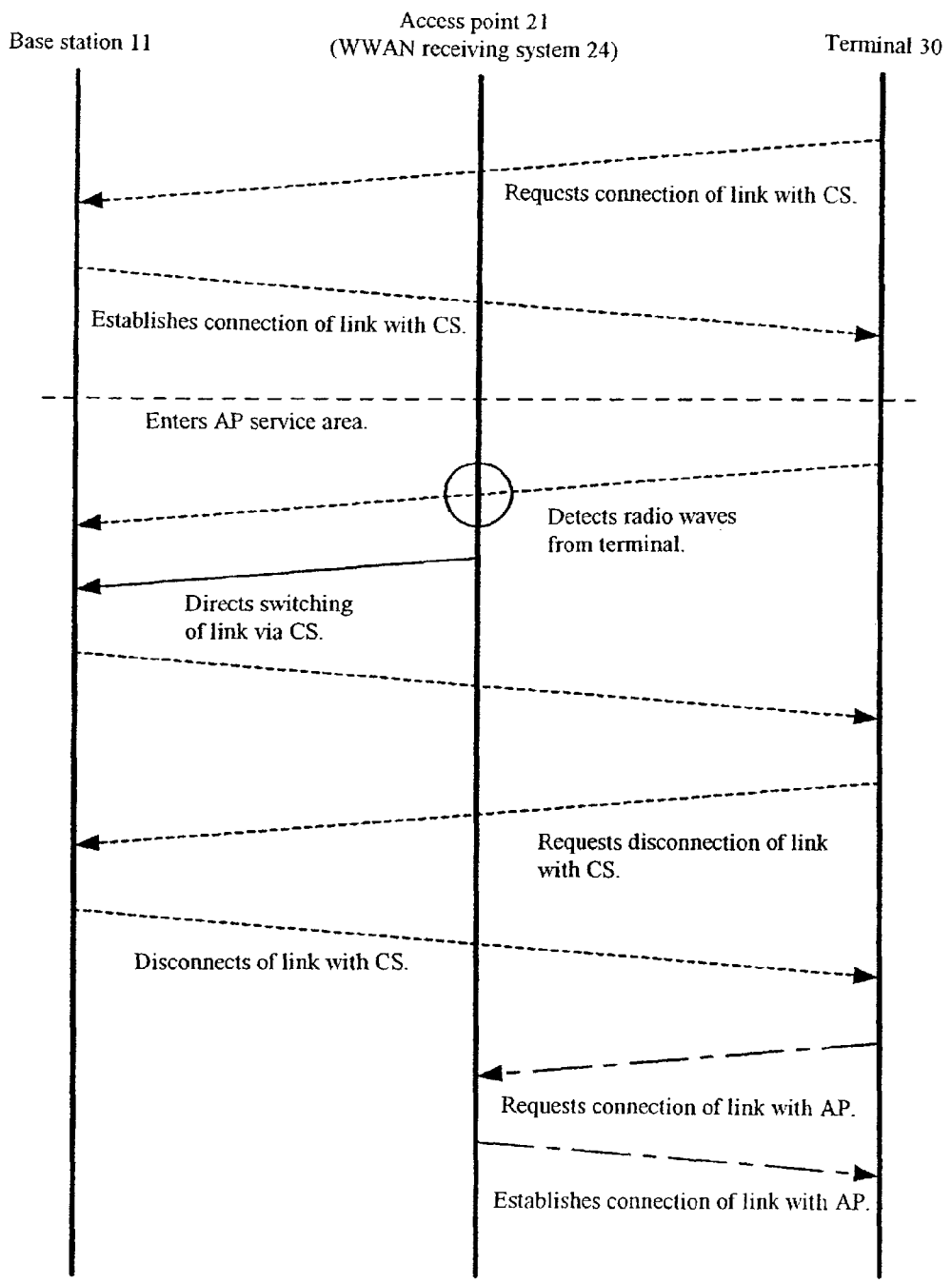
FIG. 6 is a sequence chart of a wireless communication system according to the Embodiment 1.
Figure 7:
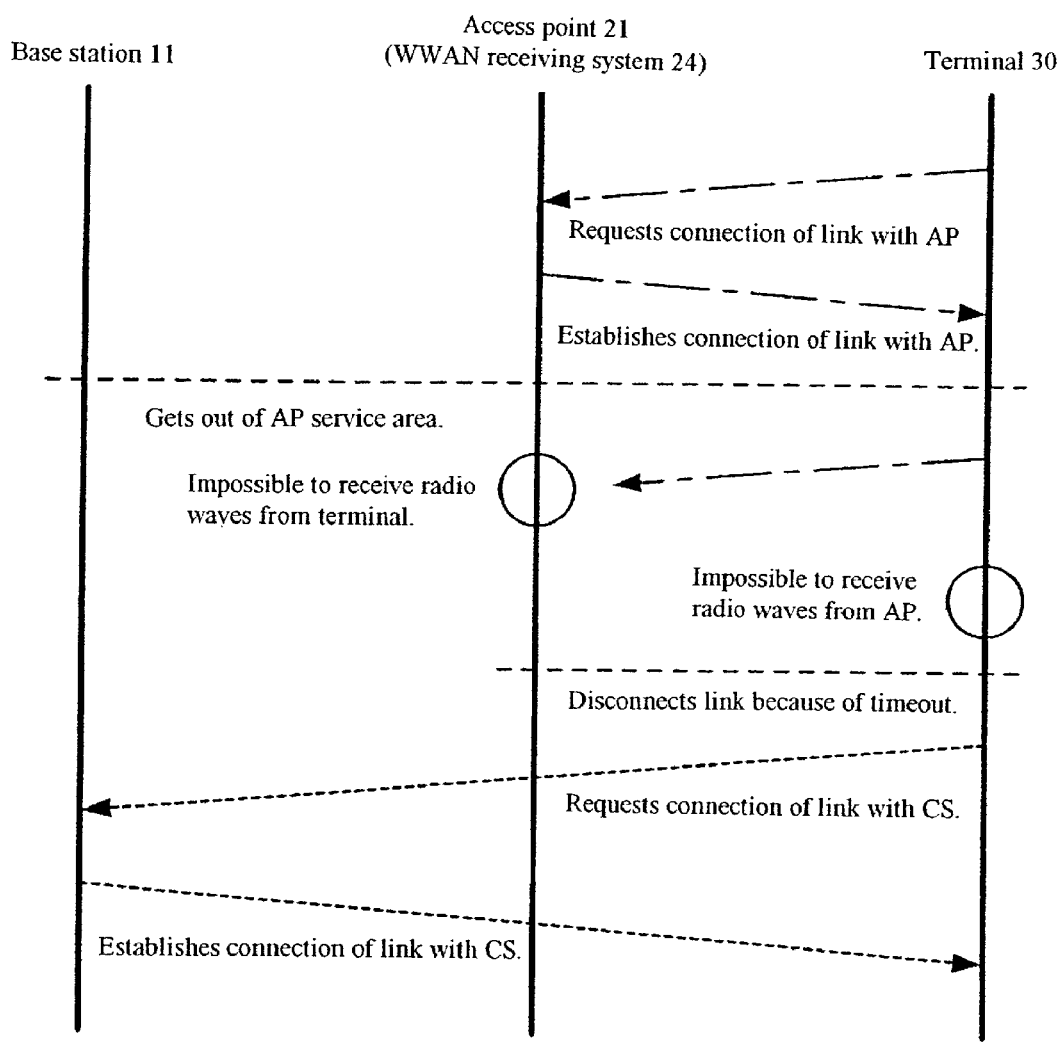
FIG. 7 is a sequence chart of a wireless communication system according to the Embodiment 1.

The sequence performed in the wireless communication system is now described based on the FIGS. 1 to 5 and the sequence charts shown in FIGS. 6 and 7. In the description, a user carrying the terminal 30 is assumed to travel along the arrow direction shown in FIG. 5.

The user first tries to access the Internet 40 using the terminal 30 at the starting point. In this case, the starting point is within the range of the CS service area 11a of the WWAN system 10 but beyond the AP service area 21a of the WLAN system 20. Accordingly, the terminal 30 requests a link connection from the base station (CS) 11 of the WWAN system 10 to establish a link connection with the base station 11. This starts Internet connection at a relatively low speed (max.: 384 kbps). The user moves while using the terminal 30 to access the Internet 40 via the WWAN system 10.

The WWAN receiving system 24 of the WLAN system 20 constantly receives 2.0 GHz band radio waves. As the terminal 30 comes closer to the AP service area 21a, the intensity of radio waves from the terminal 30 received at the WWAN receiving system 24 is gradually strengthened. When the terminal 30 enters the AP service area 21a, the intensity of the radio waves from the terminal 30 received at the WWAN receiving system 24 exceeds the threshold, and the terminal detection device 73 detects that the terminal 30 is within the AP service area 21a. An ID specific to the terminal 30 is also detected from the received radio waves. After that, the link switching server 74 directs switching from the WWAN system 10 to the WLAN system 20. The link switching direction is communicated to the terminal 30 having the same ID via the Internet 40 and the WWAN system 10 (the base station 11).

According to this embodiment, a message is then displayed on the display 34 of the terminal 30 indicating that the terminal 30 is within the AP service area 21a of the WLAN system 20, that is, it can be provided with a hot-spot service. After the message is displayed, the user may request disconnection of the link from the base station 11 of the WWAN system 10 using the terminal 30 to disconnect the link with the base station 11. The user then may request a link connection from the access point 21 of the WLAN system 20 using the terminal 30 to establish a link with the access point 21. This starts Internet connection at a higher speed (max.: 11 Mbps) in comparison with the WWAN system 10.

When the terminal 30 gets out of the range of the AP service area 21a of the WLAN system 20, the access point 21 cannot receive radio waves from the terminal 30 any more, and at the same time, the terminal 30 is no longer receiving radio waves from access point 21, any more. Consequently, timeout is caused after a predetermined period of time, and the link between the terminal 30 and the access point 21 is disconnected. The user may try to access the Internet 40 again using the terminal 30. In this case, the location is within the CS service area 11a of the WWAN system 10 but beyond the AP service area 21a of the WLAN system 20. Accordingly, the terminal 30 may request a link connection from the base station 11 of the WWAN system 10 to establish a link connection with the base station 11. This resumes Internet connection at a relatively low speed (max.: 384 kbps).

In the sequence described above, the process executed by the base station (CS) 11 of the WWAN system 10 is as follows.

Figure 8:
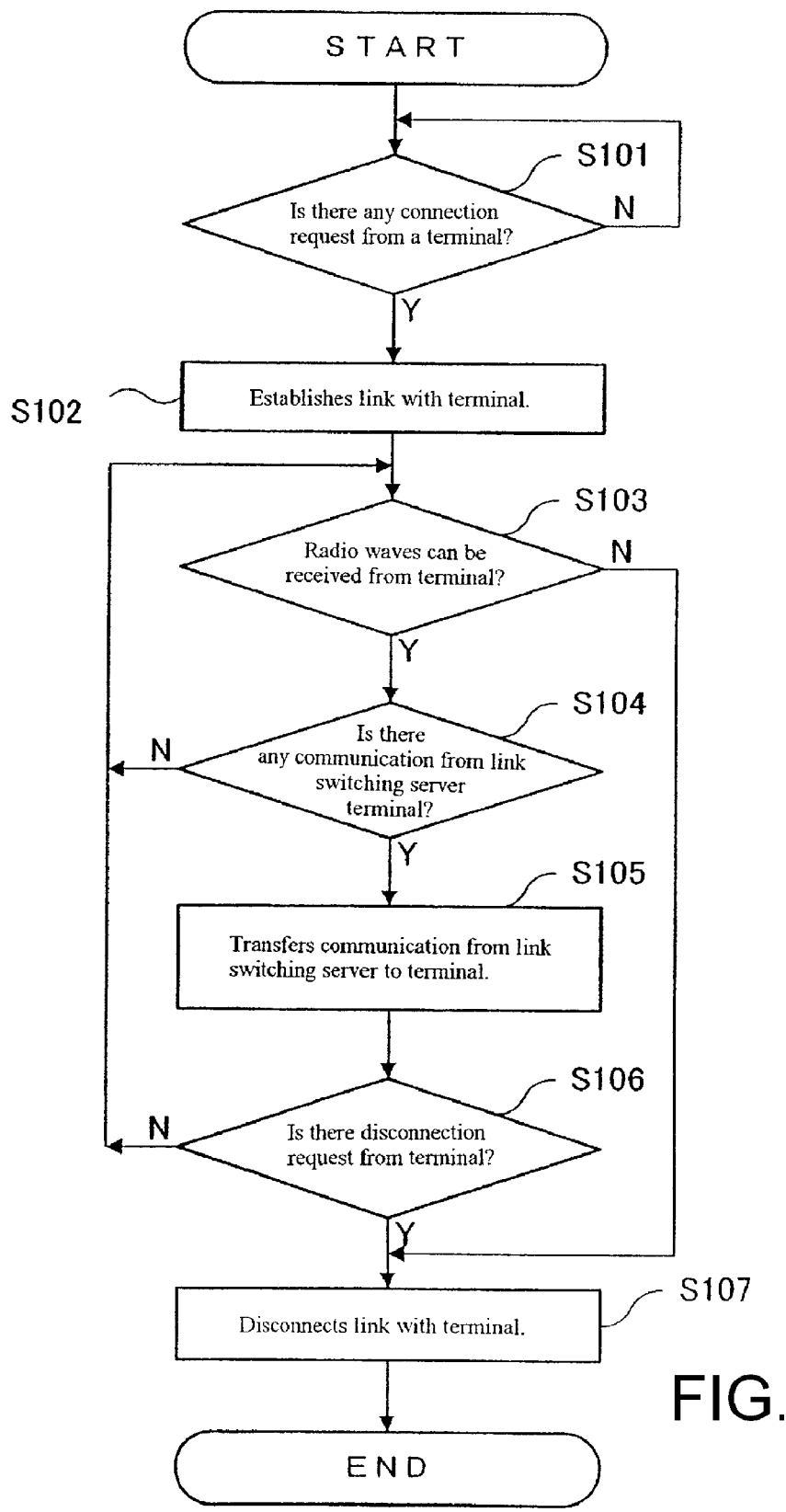
FIG. 8 is a flowchart showing a main process executed at a base station of a WWAN system.

FIG. 8 is a flowchart showing a main process executed at the base station 11. At the base station 11, it is first determined whether or not a connection has been requested from a terminal 30 (step S101). If there is no connection request from a terminal 30, the base station 11 waits until it is requested. Otherwise, a link with the terminal 30 is established (step S102). Then it is determined whether or not radio waves (2.0 GHz band) can be received from the terminal 30 with which the link has been established (step S103). When the radio waves from the terminal 30 cannot be received, the link with the terminal 30 is disconnected (step S107) and the process ends. When radio waves can be received, it is determined whether or not there is communication, that is, a link switching direction to the terminal 30 from the link switching server 74 of the WLAN system 20 (step S104). If there is no link switching direction from the link switching server 74, the process returns to the step S103. Otherwise, the communication, that is, the link switching direction from the link switching server 74 to the terminal 30 is transferred (step S105). Then it is determined whether or not disconnection has been requested from the terminal 30 (step S106). If disconnection has not been requested by the terminal 30, the process again returns to the step S103. Otherwise, the link with the terminal 30 is disconnected (step S107) and the process ends.

In the sequence described above, the process executed at the access point (AP) 21 of the WLAN system 20 is as follows.

Figure 9:
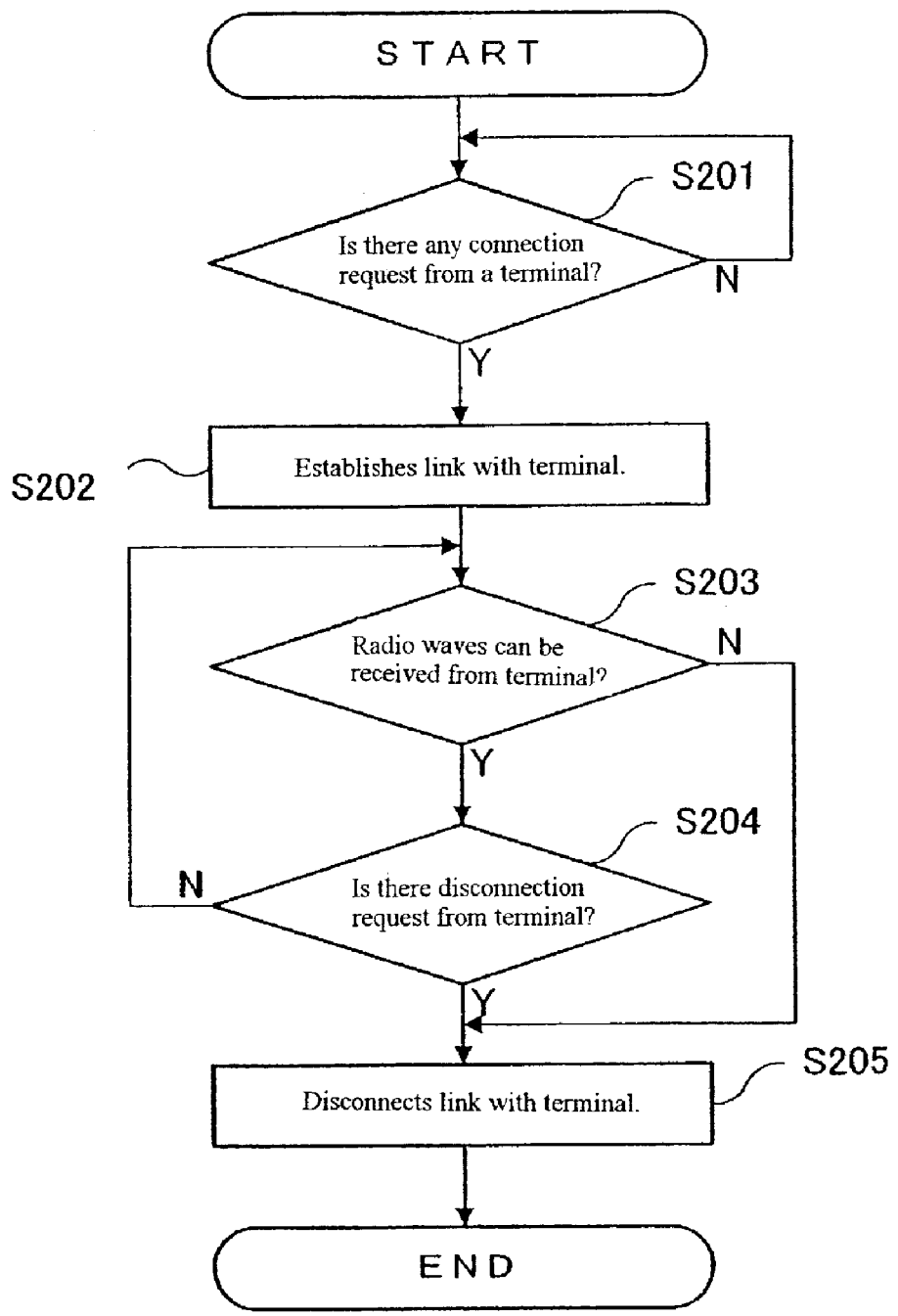
FIG. 9 is a flowchart showing a main process executed at an access point of a WLAN system.

FIG. 9 is a flowchart showing a main process executed at the access point 21. At the access point 21, it is first determined whether or not a connection has been requested from a terminal 30 (step S201). If there is no connection request from a terminal 30, the access point 21 waits until it is requested. Otherwise a link with the terminal 30 is established (step S202). Then it is determined whether or not radio waves (2.4 GHz band) can be received from the terminal 30 with which the link has been established (step S203). When the radio waves from the terminal 30 cannot be received, the link with the terminal 30 is disconnected (step S205) and the process ends. When radio waves can be received, it is determined whether or not disconnection is requested from the terminal 30 (step S204). If there is no disconnection request from the terminal 30, the process again returns to the step S203. Otherwise, the link with the terminal 30 is disconnected (step S205) and the process ends.

In the sequence described above, the process executed at the WWAN receiving system 24 of the WLAN system 20 is as follows.

Figure 10:
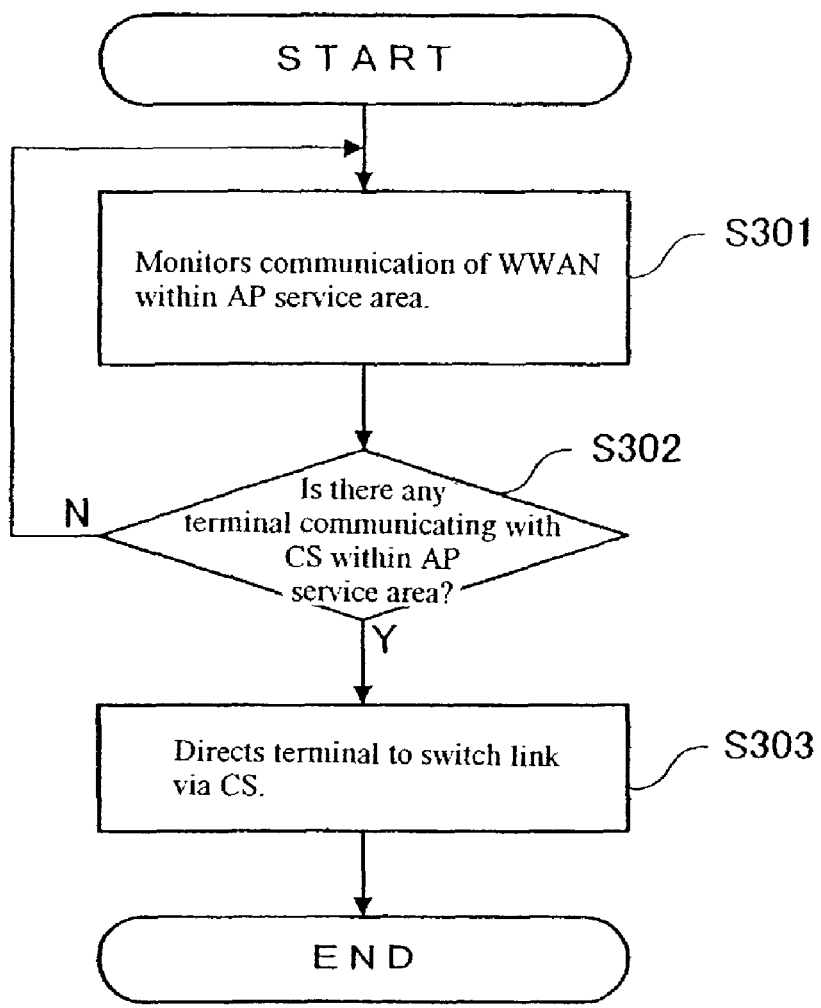
FIG. 10 is a flowchart showing a main process executed at a WWAN receiving system of a WLAN system.

FIG. 10 is a flowchart showing a main process executed at the WWAN receiving system 24. At the WWAN receiving system 24, the communication is monitored by the WWAN system 10 first (step S301). Then, it is determined whether or not there is any terminal 30 communicating with the base station 11 within the AP service area 21*a* of the access point 21 based on the intensity of the radio waves of the communication being monitored (step S302). If there is no terminal 30 communicating with the base station 11, the process returns to step S301. Otherwise, the WWAN receiving system 24 directs the terminal 30 to switch the link, via the Internet 40 and the base station 11 of the WWAN system 10 (step S303), and the process ends.

In the sequence described above, the process executed at the terminal 30 is as follows.

Figure 11:
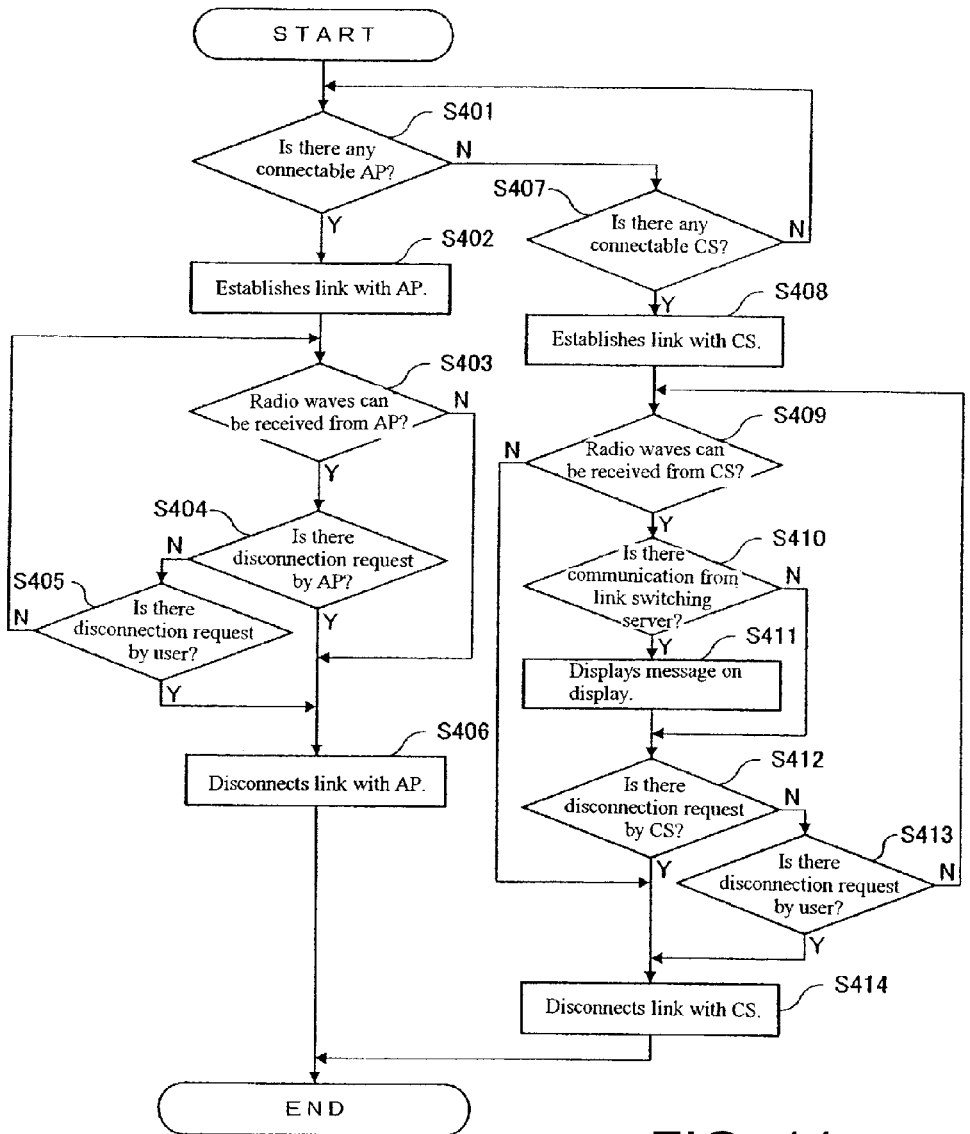
FIG. 11 is a flowchart showing a main process executed at a terminal.

FIG. 11 is a flowchart showing a main process executed at the terminal 30. At the terminal 30, it is determined first whether or not there is any connectable access point 21 for Internet connection (step S401). If there is any access point 21 to be connected to the terminal 30, that is, the terminal 30 is within the AP service area 21*a*, a link between the terminal 30 and the access point 21 is established (step S402). The flow of the process to be caused when there is no access point 21 connectable to the terminal 30 will be described later. It is then determined whether or not the radio waves (2.4 GHz band) from the access point 21, for which a link with the terminal 30 has been established, can be received (step S403). When the radio waves from the access point 21 cannot be received, the link with the access point 21 is disconnected (step S406), and the process ends. Otherwise, it is then determined whether or not disconnection is requested by the access point 21 (step S404). If disconnection is requested by the access point 21, the link with the access point 21 is disconnected (step S406), and the process ends. Otherwise, it is then determined whether or not disconnection is requested by the user (step S405). If disconnection is requested by the user, the link with the access point 21 is disconnected (step S406), and the process ends. Otherwise, the process again returns to step S403.

When there is no access point 21 to be connected to the terminal 30, that is, the terminal 30 is beyond the AP service area 21*a*, at step S401, it is then determined whether or not there is any connectable base station 11 (step S407). If there is any base station 11 to be connected to the terminal 30, then a link between the terminal 30 and the base station 11 is established (step S408). Otherwise, the process returns to step S401. It is then determined whether or not radio waves (2.0 GHz band) can be received from the base station 11 with which a link has been established (step S409). When the radio waves from the base station 11 cannot be received, the link with the base station 11 is disconnected (step S414) and the process ends. Otherwise, it is determined whether or not there is communication, that is, a link switching direction from the link switching server 74 of the WLAN system 20 (step S410). If there is a link switching direction, a message is displayed on the display 34 (step S411). Otherwise, the process proceeds to the next step S412. It is then determined whether or not disconnection has been requested by the base station 11 (step S412). When disconnection has been requested by the base station 11, the link with the base station 11 is disconnected (step S414) and the process ends. Otherwise, it is then determined whether or not disconnection has been requested by the user (step S413). When disconnection has been requested by the user, the link with the base station 11 is disconnected (step S414) and the process ends. Otherwise, the process again returns to step S409.

As described above in detail, in this embodiment, the terminal 30 is notified via the base station 11 of the WWAN system 10 that it is within the AP service area 21*a* of the WLAN system 20, so that it is not necessary to always use the WLAN communication system 31 of the terminal 30 to search, thereby preventing increase in power consumption of the terminal 30. Internet connection can be established utilizing the WWAN system 10 within the CS service area 11*a* of the WWAN system 10, except for the AP service areas 21*a* of the WLAN system 20, and utilizing the WLAN system 20 within the AP service areas 21*a* of the WLAN system 20. That is, optimal Internet connection can be realized depending on the location of the terminal 30.

Though, in this embodiment, the user manually switches the destination to be connected when the terminal 30 receives a link switching direction from the link switching server 74, it is not always the case. For example, connection with the WWAN system 10 and connection with the WLAN system 20 may be automatically switched when the terminal receives a link switching direction from the link switching server 74.

Though, in this embodiment, an example has been described which utilizes a third generation mobile phone network as the WWAN system 10, it is not always the case. For example, an existing network such as a second generation mobile phone network and a PHS (Personal Handyphone System) network may be used as the WWAN system 10. On the other hand, in this embodiment, an example has been described which utilizes a wireless LAN in conformity with IEEE 802.11b as the WLAN system 20, it is not always the case. For example, a wireless LAN such as those in conformity with Bluetooth, IEEE 802.11a, or IEEE 802.11g may be used as the WLAN system 20.

Though, in this embodiment, the whole base station 11 is provided within the CS service area 11*a*, only at least the WWAN antenna 51 is required to be provided within the CS service area 11*a* and the WWAN radio transceiver 52 and the base station control unit 53 may be located outside the CS service area 11*a*. Though, in this embodiment, the whole access point 21 is provided within the AP service area 21*a*, only at least the WLAN antenna 61 is required to be within the AP service area 21*a* and the WLAN radio transceiver 62 and the AP control unit 63 may be located outside the AP service area 21*a*.

Figure 12:
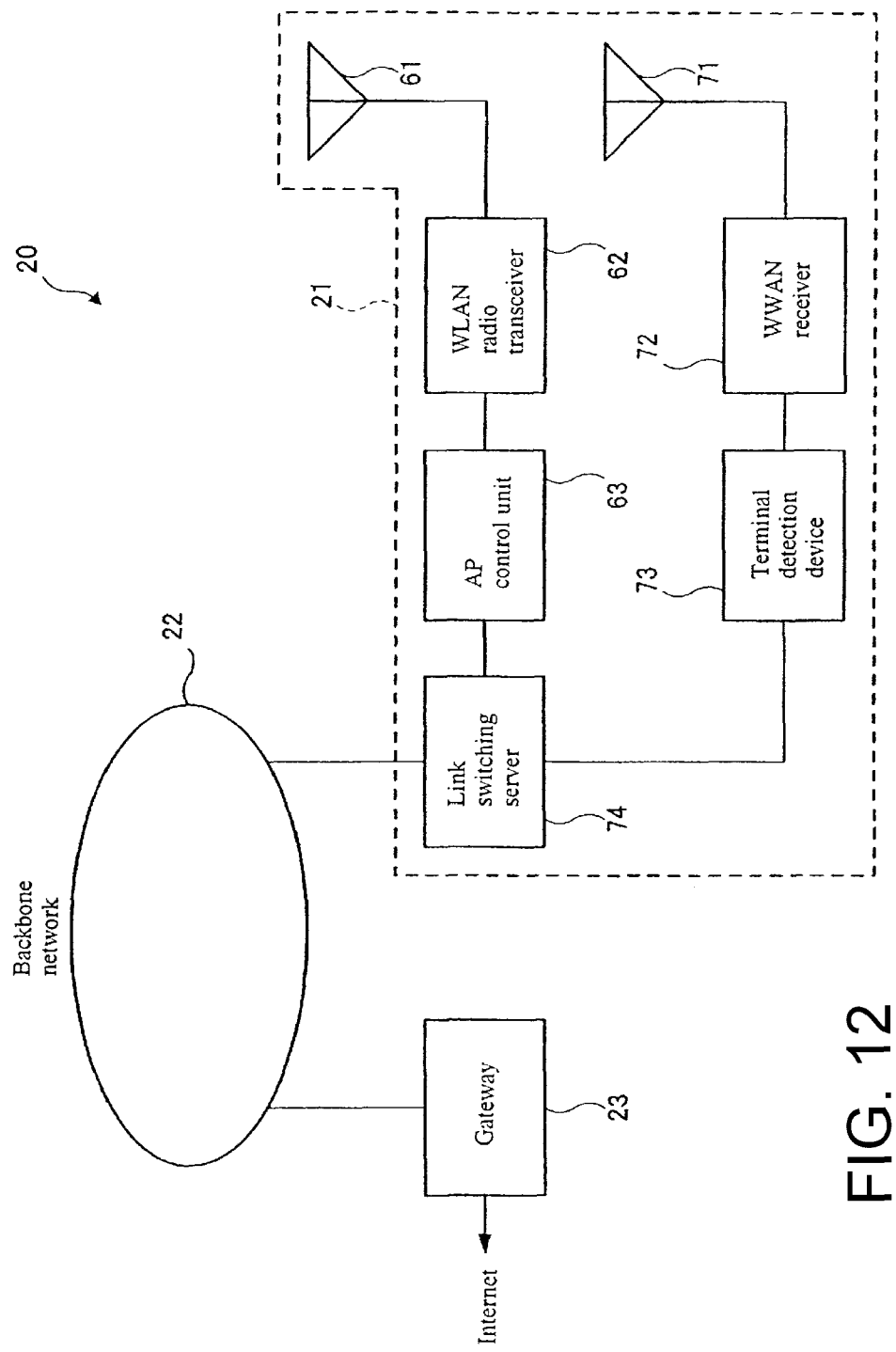
FIG. 12 illustrates a configuration example of an access point and a WWAN receiving system of a WLAN system.

Though, in this embodiment, the access point 21 and the WWAN receiving system 24 are separately arranged in the WLAN system 20, it is not always the case. For example, as shown in FIG. 12, they may be integrated as an access point 21.

Embodiment 2

Figure 13:
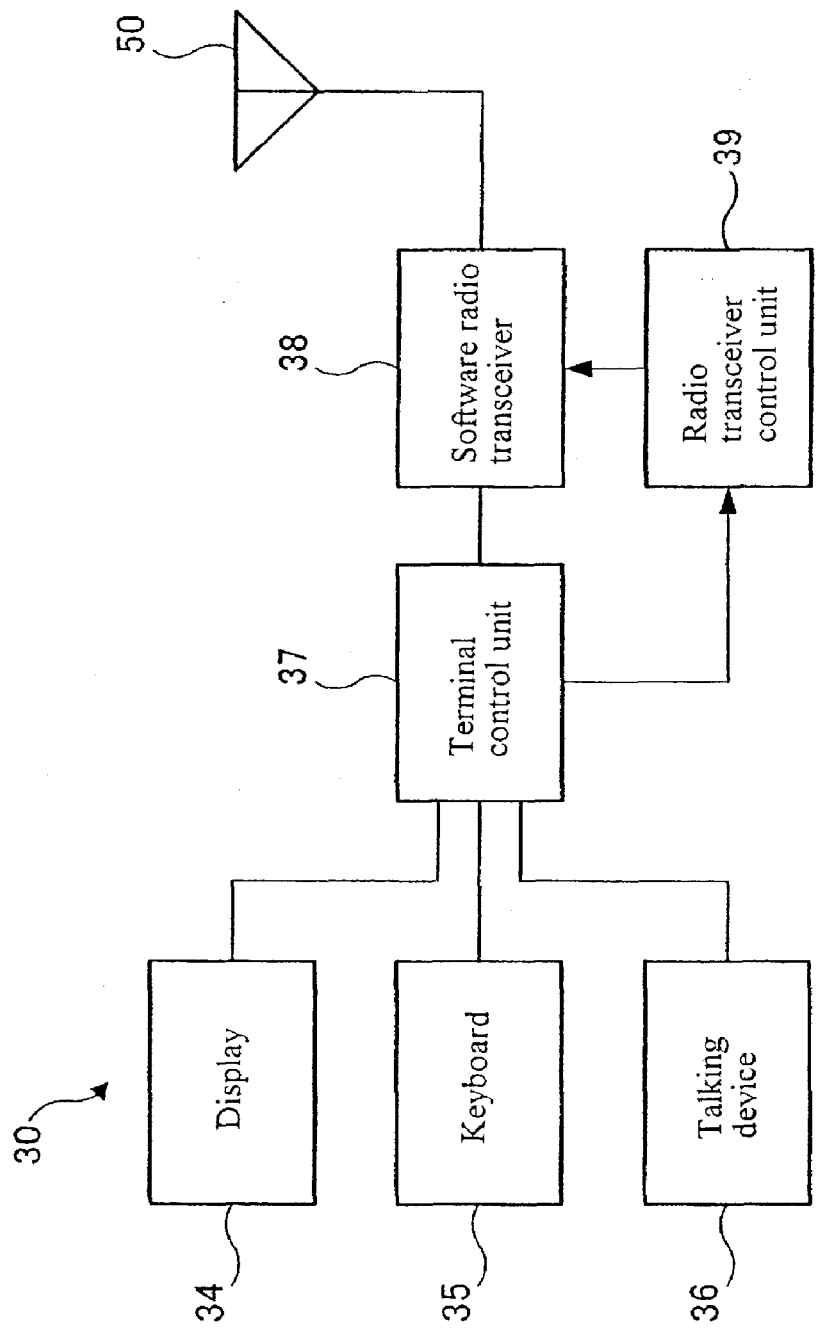
FIG. 13 illustrates a mobile terminal (terminal) in Embodiment 2.

Though this embodiment is almost the same as the Embodiment 1, the terminal 30 is differently configured as shown in FIG. 13. In this embodiment, the same elements described in relation to the Embodiment 1 are denoted by the same reference numerals, and the detailed description thereof is omitted.

In this embodiment, the terminal 30 is equipped with a software radio transceiver 38 instead of the WLAN communication system 31 and the WWAN communication system 32 used in the Embodiment 1. Unlike a radio transceiver configured with analog circuits or dedicated digital circuits, the software radio transceiver 38 is configured with general-purpose digital circuits-such as MPU (Micro Processing Unit), DSP (Digital Signal Processor), and FPGA (Field Programmable Gate Array) so that radio transceiver capabilities are programmably realized with software. In this embodiment, the software radio transceiver 38 can be switched between a radio transceiver capable of communicating with the base station 11 of the WWAN system 10 and a radio transceiver capable of communicating with the access point 21 of the WLAN system 20 based on a direction from a radio transceiver control unit 39. An antenna 50 is capable of transmitting and receiving both of 2.0 GHz and 2.4 GHz band radio waves.

In this embodiment, use of the software radio transceiver 38 allows the terminal 30 to be lightweight and small-sized. When the software radio transceiver 38 is used, communication is possible with only one of the base station 11 of the WWAN system 10 and the access point 21 of the WLAN system 20. Therefore, it is impossible to check if the terminal 30 is within the AP service area 21*a* of the WLAN system 20 by transmitting/receiving 2.4 GHz band radio waves while connecting to the Internet utilizing the WWAN system 10 (that is, via 2.0 GHz band communication). By notifying the terminal 30 that it is within the AP service area 21*a* of the WLAN system 20 via the base station 11 of the WWAN system 10, however, it is possible to check if it is within the AP service area 21*a* while connecting to the Internet via the WWAN system 10 even when the software radio transceiver 38 is used.

Furthermore, according to the present invention, the user can be notified that his mobile terminal is within an area where it can be provided with local fast wireless communication such as a hot-spot service.

In the drawings and specifications there has been set forth preferred embodiments of the invention and, although specific terms are used, the description thus given uses terminology in a generic and descriptive sense only and not for purposes of limitation.

While the present invention has been described with respect to the embodiments of the invention, the technical scope of the present invention is not limited to the described embodiments. Various changes and modifications may be made in the described embodiments. As is apparent from the description in the appended Claims, modes of the present invention characterized by such changes and modifications are also included in the technical scope of the invention.

I claim:

1. A wireless communication system, comprising:
   a base station providing a low-speed wireless communication service utilizing a wireless wide area network (WWAN) communication protocol;
   an access point providing a high-speed wireless communication service utilizing a WLAN communication protocol; and
   a terminal capable of receiving both of said low-speed wireless communication service and said high-speed wireless communication service, wherein said access point is external to said terminal, said access point detecting said terminal utilizing the low-speed wireless communication service within the limited area by measuring intensity of radio waves used for the WWAN communication protocol, and wherein responsive to said detection of the terminal, said access point directs said terminal to establish a connection to said access point and in response to the connection to switch to the high speed wireless communication service by providing access point connection information to the terminal via the WWAN communication protocol.

2. The wireless communication system of claim 1, wherein said terminal includes a first receiver for communicating using the low speed wireless communication system and a second transceiver for communication using the high speed wireless communication receiver, wherein said first transceiver is operating when said access point detects said terminal utilizing said low speed wireless communication service within the limited area.

3. The wireless communication system of claim 1, wherein said terminal includes only a single radio transceiver switchable between a first state in which said terminal is capable of communicating utilizing WWAN communication protocol and a second state in which the terminal is capable of communicating utilizing WLAN communicating protocol.

4. An access point comprising:
   communication logic for providing a limited-area wireless communication service;
   detection logic which detects the presence of a terminal within the limited area by measuring intensity of radio waves used for a wireless wide area network (WWAN) communication protocol while the terminal is receiving a public wireless communication service from a base station of the public wireless communication system;
   output logic which sends a direction, including access point connection information, via the WWAN communication protocol, to the terminal to establish a connection to the access point and to switch to the limited-area wireless communication service based on the detection by said detection logic absent a search by said terminal for said limited-area wireless communication service;
said base station utilizing a wireless wide area network communication protocol; and
said access point utilizing a wireless local area network communication protocol.

5. The access point according to claim 4, wherein said detection logic recognizes an ID of the terminal included in the public wireless communication signals transmitted by the terminal, and said output logic sends the switching direction in association with the ID to the base station.

6. The access point according to claim 4, wherein said access point includes a receiver for receiving signals transmitted via the public wireless communication service and a transceiver for transmitting and receiving signals via the limited-area wireless communication service utilizing WLAN communication protocol, thereby reducing power consumption by the terminal.

7. A terminal detection device comprising:
detection logic which detects the presence of a terminal within a limited area where a limited-area wireless communication service is provided by measuring intensity of radio waves used for a wireless wide area network (WWAN) communication protocol, the terminal receiving a public wireless communication service from a base station of the public wireless communication system wherein the terminal detection device includes a first receiver for receiving signals via the public wireless communication system and a second receiver for receiving signals via the limited-area wireless communication service;
said base station utilizing the WWAN communication protocol;
said limited area communication service utilizing a wireless local area network communication protocol; and
output logic which sends a direction and access point connection information via the WWAN communication protocol to the base station for the terminal to establish connection to said access point and to direct a switch to the limited-area wireless communication service based on detection by said detection logic and the established connection.

8. The terminal detection service according to claim 7, wherein said detection logic detects the presence of the terminal within the limited area based on reception of public wireless communication signals transmitted by the terminal.

9. An apparatus comprising:
a first communication logic which provides a wide-area wireless communication;
said wide-area wireless communication utilizing a wireless wide area network communication protocol;
a second communication logic for receiving a wireless communication service provided within a limited area;
said limited-area communication utilizing a wireless local area network communication protocol; and
reception logic which receives information via said first communication logic through said wide-area wireless communication service, that the wireless communication service can be executed, wherein an access point is enabled to detect said apparatus utilizing the low-speed wireless communication service by measuring intensity of radio waves used for the wireless wide area network communication and direct said terminal to establish connection to said access point and to switch to the high speed wireless communication service with access point connection information provided via the wide area network communication protocol to the terminal;
wherein said second communication logic is powered off when said reception logic receives said information that the wireless communication service can be executed.

10. The apparatus according to claim 9, wherein said first communication logic and said second communication logic are comprised of one communication logic capable of executing wireless communication through multiple different communication methods.

11. The apparatus according to claim 9, further comprising switching logic which switches from said first communication logic to said second communication logic when said reception logic receives the information that the wireless communication service can be executed.

12. A method comprising the steps of:
detecting the presence of a terminal within a limited area by measuring intensity of radio waves used for a wireless wide area network (WWAN) communication protocol where a limited-area wireless communication service is provided by an access point external to the terminal, the terminal receiving a public wireless communication service from a base station of a public wireless communication system;
said base station utilizing the WWAN communication protocol;
said limited area communication service utilizing a wireless local area network communication protocol; and
directing, by the access point, the base station to switch the terminal to the limited area wireless communication service by providing access point connection information via the WWAN communication protocol and based on said detection of the presence of the terminal.

13. The method according to claim 12, wherein said detecting the presence of the terminal within the limited area is based on reception of public wireless communication signals transmitted by the terminal.

14. A method comprising the steps of:
a terminal receiving direction, including access point connection information, via a wide area network communication protocol from an access point, remote from the receiving terminal, to establish a connection to the access point and to switch to a wireless communication service for a limited area, via the wide area wireless communication service, wherein the access point is enabled to detect said terminal utilizing the low-speed wireless communication service by measuring intensity of radio waves used for the wide area wireless communication service;
said wide area communication service utilizing a wireless wide area network communication protocol;
said access point utilizing a wireless local area network communication protocol; and
switching from the wide-area wireless communication service to the wireless local area communication service in response to said switching direction;
wherein said switching includes powering on a transceiver for the wireless communication service that was powered off during said receiving of said direction.

15. A program product comprising:
a computer useable medium having computer readable program code embodied therein for use with a computer, the computer readable program code in said program product implementing functions effective to:
detect the presence of a terminal within a limited area by measuring intensity of radio waves used for a public wireless communication service wherein a limited-area wireless communication service is provided by an access point remote from the terminal, the terminal receiving a the public wireless communication service from a base station of a public wireless communication system;
said base station utilizing a wireless wide area network communication protocol;
said access point utilizing a wireless local area network communication protocol; and
the access point directing the terminal to establish connection to the access point and to switch to the limited-area wireless communication service by providing access point connection information via the wide area network communication protocol to the terminal and based on the detection of the presence of the terminal.

16. A program product comprising: a computer useable medium having computer readable program code embodied therein for use with a computer, the computer readable program code in said program product implementing functions effective to:
receive a direction with access point connection information via a wide area wireless communication service, to establish connection to the access point and to switch to a limited-area wireless communication service via the wide-area wireless communication service absent a search for a different communication service;
said wide-area communication service utilizing a wireless wide area network communication protocol;
said limited area communication service utilizing a wireless local area network communication protocol; and
switch from the wide-area wireless communication service to the limited-area wireless communication service in response to said received direction, wherein an access point is enabled to detect a terminal utilizing the low-speed wireless communication service by measuring intensity of radio waves used for the wide area wireless communication service;
wherein said switching includes powering on a transceiver for the wireless communication service that was powered off during said receiving of said direction.

* * * * *